United States Statutory Invention Registration [19]

[11] Reg. Number: H942

Pardee

[43] Published: Aug. 6, 1991

[54] SABOTED MUNITION WITH A MOVABLE FIN GROUP

[75] Inventor: Martin L. Pardee, Great Meadows, N.J.

[73] Assignee: The United States of America as represented by the Secretary of the Army, Washington, D.C.

[21] Appl. No.: 612,287

[22] Filed: Nov. 6, 1990

[51] Int. Cl.[5] ..... F42B 14/06

[52] U.S. Cl. ..... 102/522; 102/501; 244/3.26

*Primary Examiner*—Harold J. Tudor

*Attorney, Agent, or Firm*—Anthony T. Lane; Edward Goldberg; Michael Sachs

[57] ABSTRACT

An armor piercing convertible fin saboted round for a machine gun includes a penetrator on which a fin group is mounted so that the penetrator can extend into a prelaunch sabot with the fin group arranged around the penetrator. The fin group advantageously carries a pin which engages in an elongated groove defined on the penetrator and permits the fin group to slide along the body of the penetrator during launch so that it may move from a forward position adjacent the tip of the penetrator rearwardly during launch to an end position in which it is engaged adjacent the end of the penetrator and stabilizes the penetrator during flight.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SABOTED MUNITION WITH A MOVABLE FIN GROUP

GOVERNMENTAL INTEREST

The invention described herein may be made or used by or for the Government for governmental purposes without payment to me of any royalties thereon.

FIELD AND BACKGROUND OF THE INVENTION

This invention relates in general to saboted rounds of ammunition and in particular to a new and useful saboted round for a machine gun which includes a fin group which rides on a penetrator. It may move from a forward position of prelaunch in which the penetrator is arranged within a sabot to a post launch configuration in which the stabilizing fin group is movable back along the penetrator to a rear position in which it stabilizes the penetrator.

The invention is designed to insure that a saboted sub-calibre machine gun ammunition is improved in its performance by the use of a movable fin group construction which is disposed around a penetrator. Increased velocity and accuracy are desirable features in small caliber projectiles. In any instance there is a transient instability during a flight of the projectile during launching. This imposes a large performance penalty on the projectile. Such instabilities are aggravated in subcalibre fin stabilized projectiles by collisions between discarded sabot and the fins of the projectile.

SUMMARY OF THE INVENTION

In accordance with the invention the projectile is provided with a fin which rides on a penetrator at the forward end when it is in a prelaunch arrangement within a sabot. In accordance with the invention the fin group is arranged on the penetrator so that it rides on the body of the penetrator up to the point of sabot discard.

In an arrangement of the invention a sliding fin group is positioned on the penetrator in front of the sabot. When the sabot leaves the penetrator the fin group is free to move to the rear of the penetrator under the influence of aerodynamic drag forces. With the inventive arrangement the fin group is arranged on the penetrator at a location in which it extends out of the sabot and is thus out of the sabot discard path at all times.

In accordance with the invention a fin group transfer failure due to cocking and sticking is not possible. This is overcome by controlling tolerances between the fin group which is arranged on the penetrator and the penetrator outside diameter. In some instances it is also desirable to use a dry lubricating process on the penetrator to effect the desired movement between the fin group and the penetrator. A further alternative is the use of a nylon liner or a contoured spring steel buffer for the fin group.

With the inventive arrangement it is possible to launch the penetrator from the sabot in a manner which does not adversely influence the stability of the penetrator.

An object of the invention is to provide an improved arrangement for the mounting of a fin group on a penetrator carried in a sabot so that there is no substantial disturbance of the flight of the penetrator and its stabilization is insured.

A further object of the invention is to provide an arrangement of a fin group in respect to a penetrator of saboted sub-calibre machine gun ammunition which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DESCRIPTION OF THE PREFERRED EMBODIMENT

Figure 1:
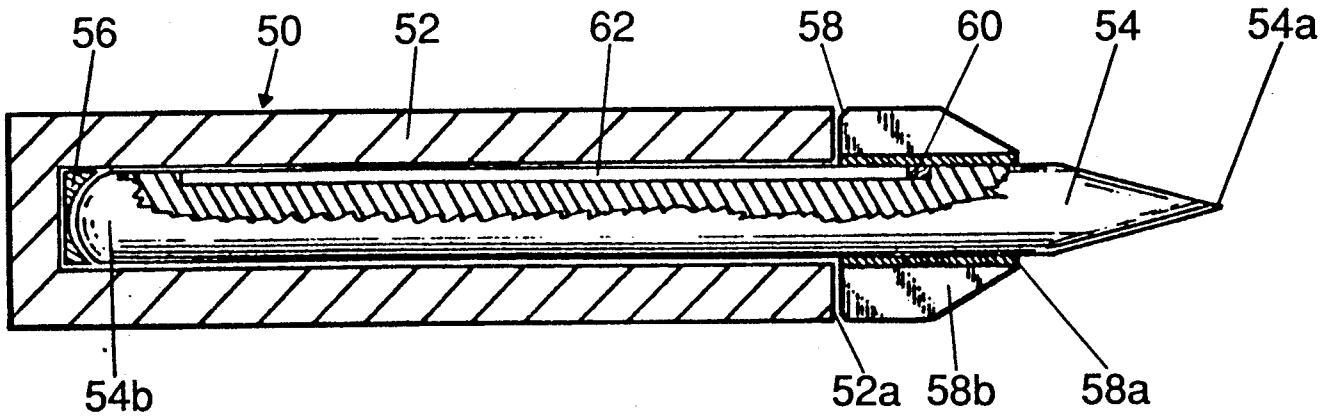
FIG. 1 is a sectional view of a saboted ammunition constructed in accordance with the invention.
Figure 2:
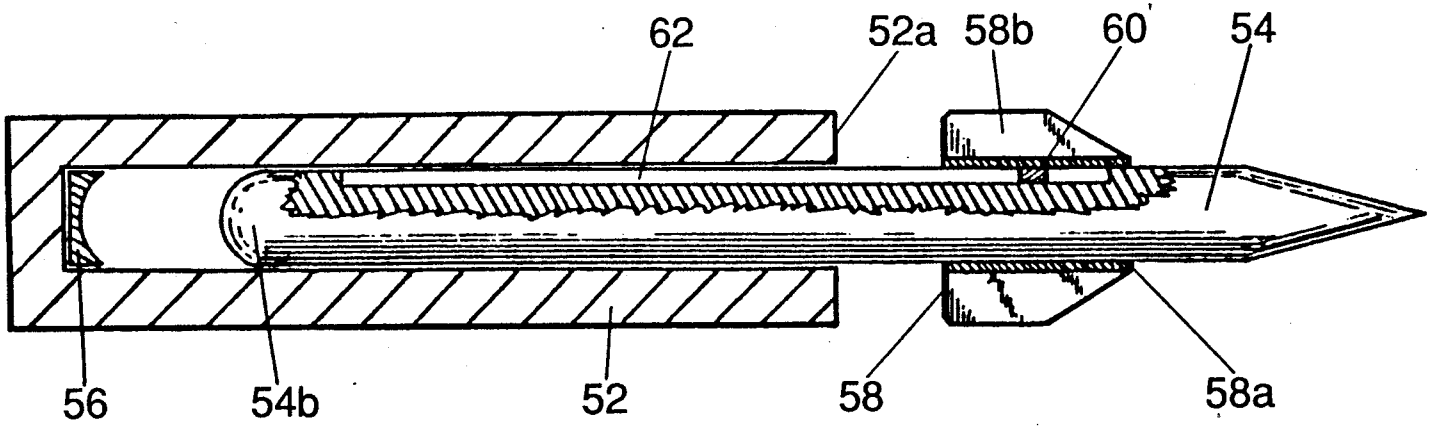
FIG. 2 is a view similar to FIG. 1 indicating the mid-launch of a penetrator of saboted ammunition shown in FIG. 1.

Referring to the drawings in particular, the invention embodied therein comprises an armor-piercing convertible fin saboted round for a fifty caliber machine gun generally designated 50. The round 50 includes a sabot or launching tube 52 in which is positioned a penetrator 54 having a forward tip 54*a* and a trailing end 54*b*. In FIG. 1 the trailing end 54*b* is located in the sabot 52 and the tip 54*a* extends out of the sabot. A base plate 56 is located inside the sabot 52.

In accordance with the invention a fin group 58 includes a collar 58*a* which extends around the penetrator 54 and carries a plurality of circumferentially spaced radially extending fins 58*b*.

In the initial pre-launch position shown in FIG. 1 the fins 58 lie adjacent the outer edge 52*a* of the sabot 52. In accordance with a feature of the invention guide means are defined between the fin group 58 and the penetrator 54 and in the embodiment illustrated they comprise a pin 60 which rides in a longitudinally extending groove 62 which is defined on the penetrator 54.

Figure 3:
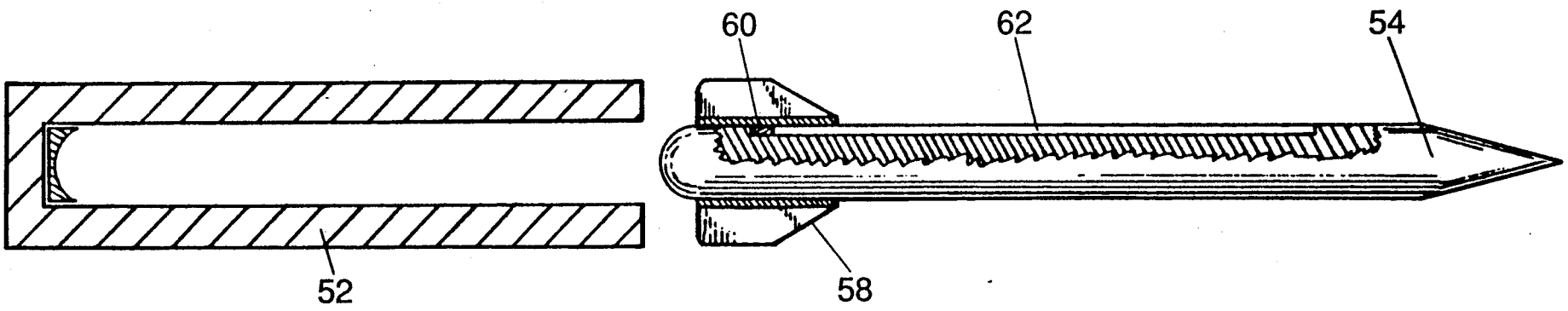
FIG. 3 is view showing the post launch arrangement of the saboted ammunition.

Immediately after launch, the pin 60 rides in the groove 62 due to the drag forces acting on the fin group 58 it moves backwardly along the penetrator 54 from its foremost position and finally ends up in a trailing position shown in FIG. 3 in which the pin 60 engages at the end of the groove 62 and stabilizes the penetrator 54 in a post-launch position. The period of flight from the initial prelaunch position to the post launch position of FIG. 3 can be estimated to about 2 to 3 milliseconds duration from photographic records of saboted rounds which are currently under development. During the first millisecond of flight the sabot is discarded. In the remaining two milliseconds the projectile travels through a region of gas discharge from the muzzle that can be characterized as a reverse flow with respect to the projectile. In such a flow the fins will be in a proper position for stabilizing the round or penetrator 54. As reverse flow dissipates and is overcome by forward flow, drag forces push the fin group to the rear end of the projectile stabilizing it in the forward flow. Calculation shows that the fin group should travel to the rear of the projectile in about 62.5 microseconds. A transition of such a brief duration virtually eliminates the possibility of instability due to fin transition. In order to insure that the fin group 58 does not override the base the fin group is guided by the pin 60 in the groove 62 and will stop at the rear end of travel of the groove. Shear problems can be overcome by the sizing of the pin and the groove.

In some instances there is a coupling of the sabot 52 and the penetrator projectile 54. Thrust washers used in such a construction will be sized to provide the desired degree of friction reduction. Additional fraction reduction will be achieved through the use of a Teflon coating for the penetrator bearing surfaces.

While a specific embodiment of the invention has been shown and described in detail to illustrate the application of the principles of the invention, it will be understood that the invention may be embodied otherwise without departing from such principles.

What is claimed is:

1. A saboted round for a machine gun, comprising a sabot, a penetrator having a body portion located within said sabot and having a tip extending out of the end thereof, and a fin group carried on said penetrator and being movable along the surface of said penetrator upon discharge from said sabot to a position at the rear end of said penetrator.

2. A machine gun round according to claim 1, wherein said fin group includes a plurality of radially extending fins mounted on said penetrator around the circumference thereof and including means defining a guide for said fin group along the length of said penetrator for stopping said fin group adjacent the rear of said penetrator.

3. A method of firing a saboted machine gun ammunition, using a fin assembly having a generally cylindrical portion and fins extending substantially radially from the cylindrical portion in association with a penetrator, the penetrator having a forward tip and an opposite trailing end; comprising placing the penetrator in a sabot so arranged that the forward tip and a length of the penetrator extends out of the sabot, and after firing, permitting the fin assembly to move down the penetrator as it exits from the sabot so that it moves to position close to the trailing end.

4. Ammunition comprising a substantially cylindrical hollow sabot having a closed end and an opposite open end, a penetrator having an inner nd close to said closed end and an opposite tip end extending out of said opposite open end, a fin member engaged on the exterior of said penetrator over a portion thereof extending out of said opposite open end and means connected between said penetrator and said fin member permitting movement of said penetrator and said fin member relatively so as to position said fin member close to said inner end immediately upon exit of said penetrator from said sabot during firing.

* * * * *